(12) United States Patent
Dong et al.

(10) Patent No.: US 10,736,262 B2
(45) Date of Patent: Aug. 11, 2020

(54) HIGH-SPEED TRANSPLANTING MECHANISM HAVING LATERALLY OPENABLE/CLOSABLE DUCKBILL

(71) Applicant: JIANGSU UNIVERSITY, Zhenjiang (CN)

(72) Inventors: Lili Dong, Zhenjiang (CN); Zhen Wang, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 188 days.

(21) Appl. No.: 16/068,367

(22) PCT Filed: Dec. 30, 2016

(86) PCT No.: PCT/CN2016/113480
§ 371 (c)(1),
(2) Date: Jul. 6, 2018

(87) PCT Pub. No.: WO2017/118344
PCT Pub. Date: Jul. 13, 2017

(65) Prior Publication Data
US 2019/0014716 A1    Jan. 17, 2019

(30) Foreign Application Priority Data
Jan. 7, 2016    (CN) .......................... 2016 1 0013461

(51) Int. Cl.
*A01C 11/02*    (2006.01)

(52) U.S. Cl.
CPC ............ *A01C 11/025* (2013.01); *A01C 11/02* (2013.01)

(58) Field of Classification Search
CPC ........ A01C 11/025; A01C 11/02; A01C 11/00
See application file for complete search history.

(56) References Cited

FOREIGN PATENT DOCUMENTS

| AU | 2394084 A | 8/1984 |
|----|-----------|--------|
| CN | 101715670 A | 6/2010 |
| CN | 101999268 A | 4/2011 |
| CN | 102498807 A | 6/2012 |
| CN | 102972132 A | 3/2013 |
| CN | 103609238 A | 3/2014 |
| CN | 104904394 A | 9/2015 |
| CN | 105493720 A | 4/2016 |
| CN | 205454550 U | 8/2016 |
| JP | 09107739 A | 4/1997 |

*Primary Examiner* — Christopher J. Novosad
(74) *Attorney, Agent, or Firm* — Soroker Agmon Nordman Pte Ltd

(57) ABSTRACT

A high-speed transplanting mechanism having a laterally openable/closable duckbill has a duckbill soil penetration angle adjusting arm disposed on a duckbill transplanting portion, the duckbill soil penetration angle adjusting arm has a rear arm and a front arm with each end thereof connected by a reverse-threaded adjusting screw rod, and other ends thereof hingedly connected to an adjusting arm support shaft and the duckbill transplanting portion, respectively. A length of the reverse-threaded adjusting screw rod enables the duckbill to tilt in a direction opposite to a driving direction of a transplanting machine, and a vertical central straight line of the duckbill makes an angle with the ground capable of being adjusted between 65°-85°.

8 Claims, 2 Drawing Sheets

HIGH-SPEED TRANSPLANTING MECHANISM HAVING LATERALLY OPENABLE/CLOSABLE DUCKBILL

TECHNICAL FIELD

The present invention relates to a high-speed transplanting mechanism having laterally openable/closable duckbill for a transplanter, especially it is a kind of high-speed transplanting mechanism, which is mainly applied to a transplanter and belongs to the technical field of agricultural machinery.

BACKGROUND ART

As compared with a conventional direct seeding manner, pot seedling transplanting has the following major advantages: growth periods of vegetables can be shortened, crop arrangement is facilitated, land utilization is improved, and economic income is increased. Transplanted pot seedling has a strong root system and consistent flowering and maturation, which can facilitate subsequent stages such as management and harvesting. Therefore, pot seedling cultivation and pot seedling transplanting have become increasingly popular among vegetable producers and flower producers. However, due to the lack of suitable auxiliary machines, pot seedling cultivation and transplanting have been labor intensive industries for a long time, where the labor cost accounts for over 50% of the total production cost. Manual transplanting has high labor intensity, low work efficiency, and low transplanting quality, so that large-area transplantation can hardly be implemented. Consequently, the production scale is small, the production efficiency is low, and the development of related crop production in China is restricted. The transplanter can not only greatly reduce the labor intensity and the production cost, improve the work efficiency, transplanting quality and the survival rate of the pot seedling, but also improve the economic and social benefits. Therefore, there is an urgent need for the development of a system that implements the mechanization of pot seedling transplanting work.

The transplanting system is the core system of the transplanter. The transplanting system is used to plant the pot seedling into the soil by duckbill with better planting quality; the pot seedling comes from the pot seedling distributor or the artificial work. Most vegetable crops need to keep the perpendicularity of the planting pot seedling; it is necessary to ensure the velocity of the relative rest. The theory of zero-speed pot seedling transplanting is to create a moment of relatively static state for each planting pot seedling in the case of continuous movement of the transplanter, in order to complete the planting under the still upright state of the pot seedling. Therefore, in the process of planting pot seedling, the forward speed of the transplanter must be equal to the horizontal velocity of the pot seedling planting moment and the opposite direction, so that the instantaneous absolute velocity of the pot seedling planting moment is zero, the pot seedling is stationary relative to the ground at this point, the pot seedling is planted into the soil by transplanting mechanism, then the soil is overlaid to complete the transplanting process. At present, the transplanter has a slow transplanting speed under the restriction of "zero-speed transplanting"; the transplanting speed is usually about 40 pot seedlings per minute.

A straight line transplanting device for a transplanter was disclosed in the invention patent CN101715670A, including a transmission device, a transplanting device, a control mechanism and a rack, it is used to drill hole, form hole and plant pot seedling. The transmission device comprises sprocket wheels, a gear, a shaft and a crank link mechanism, where the crank link mechanism is composed of a crank, a connecting rod, a push rod, a rack, and bearings. The control mechanism is composed of a stop lever, a positioning plate, a right connecting rod and a left connecting rod, and the bracket is fixed on the rack by bolt connection. The driving power of the crank link mechanism is driven by the sprocket, gear and shaft, and the reciprocating linear motion of the transplanting device is achieved by the motion of crank link mechanism. The transplanting device is in the closed state when it moves to the top dead center. The pot seedling will be put into the transplanting device by the pot seedling feeding device, in the process of the transplanting device drills into the soil near the lower dead center, the transplanting device is opened under the action of the control mechanism, the pot seedling is put into the hole of soil and the transplanting operation is completed. Then the transplanting device is moved upward, the transplanting device is closed under the action of the control mechanism when it reaches a certain height, and the next working cycle will begin. The transplanting device makes reciprocating rectilinear movement in the process of working, which improves the efficiency and reliability of a transplanter. However, the straight-line transplanting device has a velocity in the horizontal direction because it is moving forward with the transplanter, the inertia will cause the transplanting device to produce a scraping to the planted pot seedlings, in this way, the planting pot seedling is not upright and even inverted, the quality of transplanting is reduced, it is also not conducive to the pot seedling growth.

In order to prevent the injury and scraping of the pot seedling caused by the horizontal velocity of the transplanting device, a kind of transplanting mechanism for a dry land transplanter was disclosed in the invention CN101999268A, including a planetary carrier, a center wheel, a planetary wheel I, a planetary wheel II, a connecting rod I, a connecting rod II, rollers, a groove cam and a duckbill transplanting device. By controlling the parameters of planetary gear ratio, CAM groove, a planetary carrier, connecting rod length and difference of connecting rod length, the track of transplanting pot seedlings, receiving, carrying, punching, and transplanting suitable for duckbill transplanting device can be obtained. The pot seedlings planted by the transplanting mechanism designed by the track are well upright and can avoid injury and scraping of the pot seedling. But the structure of this transplanting mechanism is complicated. The pot seedling upright degree can be guaranteed when the relative velocity of the duckbill transplanting device and the ground must be zero. In particular, this transplanting mechanism has a slow transplanting speed and low work efficiency.

SUMMARY OF THE INVENTION

In view of the technical deficiencies and defects in existing transplanting mechanism of the transplanter, the present invention discloses a high-speed transplanting mechanism having a laterally openable/closable duckbill, which includes a duckbill soil penetration angle adjusting arm. The duckbill soil penetration angle adjusting arm can adjust and keep the duckbill a forward dip angle with the ground when transplanting the pot seedling into the soil. Although the pot seedlings are not erected and slightly backward at the moment of transplanting, they can be supported and pushed upright by a forward inertia thereof and the action of the rolling wheel turns the soil. Namely, the slightly backward pot seedlings transplanted by the forward duckbill are counteracted by forward inertia impulse thereof, keep the transplanted pot seedlings upright, overturning the conventional notion that seedling delivery and transplanting must be stationary. A transplanting mechanism suitable for a high-speed transplanter is provided in the present invention, it transplants more than 60 pot seedlings per minute, solve the problem of slow transplanting speed, low upright degree, and low transplanting quality, and it can increase the quality and efficiency of transplanting.

The technical solutions of the present invention are as follows: A high-speed transplanting mechanism having a laterally openable/closable duckbill includes a power input portion, a driving shaft, a rocker, a connecting rod, a transplanting power arm, a duckbill soil penetration angle adjusting arm, a duckbill transplanting portion, a pot seedling upright device, a mounting base of the transplanting device. The mounting base of the transplanting device has the power arm support shaft and the adjustable arm support shaft. The end of the driving shaft is connected to the power input portion, the other end of the driving shaft is fixed at the end of the rocker, and the other end of the rocker is hinged with the middle of the transplanting power arm. The end of the transplanting power arm is hinged with the duckbill transplanting portion, and the other end of the transplanting power arm is hinged with the power arm supporting shaft. The pot seedling upright device is installed on the transplanter. The duckbill soil penetration angle adjusting arm has a rear arm and a front arm with one end each thereof connected by means of a reverse-threaded adjusting screw rod, and other ends thereof hingedly connected to an adjusting arm support shaft and the duckbill transplanting portion respectively. A length of the reverse-threaded adjusting screw rod enables the duckbill to tilt in a direction opposite to a driving direction of a transplanting machine, and a vertical central straight line of the duckbill makes an angle with the ground capable of being adjusted between 65°-85°.

Preferably, a length of the reverse-threaded adjusting screw rod enables the duckbill to tilt in a direction opposite to a driving direction of the transplanter, and a vertical central straight line of the duckbill makes an angle with the ground capable of being adjusted between 75°-85°.

Preferably, each end of the reverse-threaded adjusting screw rod is equipped with fastening nuts respectively.

Preferably, an extension is respectively set at one end of the screw hole of the rear arm and the front arm, and the two extension parts can be connected by sliding fit.

Preferably, a sliding adjusting groove is provided on the extension part of the rear arm connected to the front arm, a guide pin shaft is provided on the extension part of the front arm connected to the rear arm, and the guide pin shaft is inserted into the sliding adjusting groove.

Preferably, the extension part of the front arm has a counterbore that corresponds to the sectional shape of the extension part section of the rear arm, the extension part of the rear arm is inserted into the counterbore, and the two sides of the counterbore are the sliding guide fit.

Preferably, there are some ball bearings between the extension of the rear arm and the counter bore.

Preferably, an angle scale plate is set on one side of the duckbill transplanting portion.

The high-speed transplanting mechanism having a laterally openable/closable duckbill according to the present invention is mainly used for the dig-holes transplanter. There is a duckbill soil penetration angle adjusting arm. The duckbill soil penetration angle can be adjusted by adjusting the reverse-threaded adjusting screw rod, and a vertical central straight line of the duckbill makes an inclination angle with the opposite direction of the transplanter, this causes the pot seedlings to be tilted in the opposite direction of the transplanter when it is implanted. The pot seedlings in the duckbill are the same horizontal velocity as the transplanter during the transplanting process, that is, the pot seedling will have the same speed as the transplanter in the moment of transplanting. Thus, the backward tilting pot seedlings will be counteracted by the forward inertia thereof, and the pot seedlings can be supported and pushed upright by the action of the rolling wheel turns the soil. The high-speed transplanting mechanism overcomes the current problems of slow transplanting speed and the bad upright degree, and improves the planting quality of pot seedlings.

At the same time, the high-speed transplanting mechanism having a laterally openable/closable duckbill according to the present invention makes the pot seedling stand up by the forward inertial force thereof and the rolling wheel turns the soil, overturning the conventional notion that seedling delivery and transplanting must be stationary, and increasing the efficiency and quality of transplanting. The speed of transplanting pot seedling is more than 60 pot seedlings per minute, and the pot seedlings will be not damaged by the opening and closing duckbill and the forward inertia impulse thereof when pot seedlings are planting. Therefore, the high-speed transplanting mechanism of the present invention has improved the quality of planting pot seedlings and provided support for the research and development of a high-speed transplanter.

Figure 1:
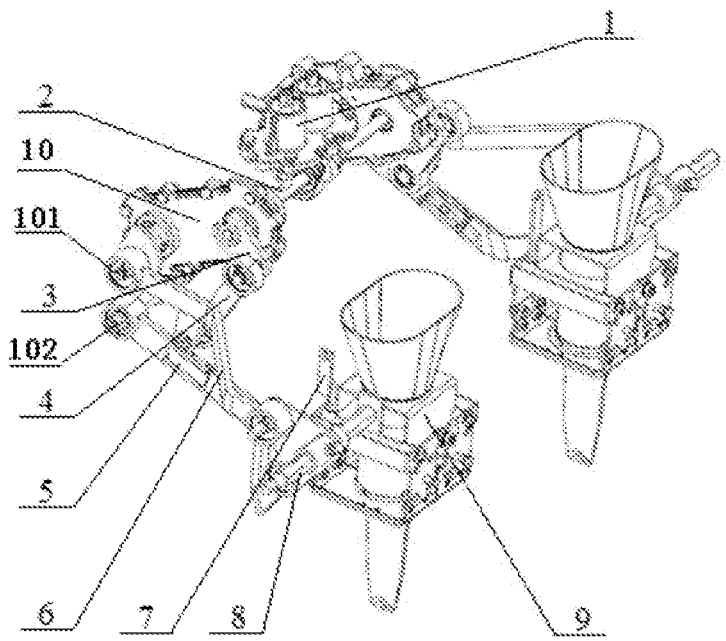
FIG. 1: Schematic structure view of the high-speed transplanting mechanism having a laterally openable/closable duckbill according to the present invention.

In the drawings: 1. power input portion; 2. driving shaft; 3. rocker; 4. connecting rod; 5. duckbill soil penetration angle adjusting arm; 6. transplanting power arm; 7. duckbill opening and closing control part; 8. lateral adjusting rod; 9. duckbill transplanting portion; 10. mounting base of the transplanting device; 101. power arm support shaft; 102. adjustable arm support shaft: 51. reverse-threaded adjusting screw rod; 52. rear arm; 521. left-handed threads hole; 522. sliding adjusting groove; 523. rear arm rotating sleeve: 53. guide pin shaft, 54. front arm; 541. right-handed threads hole; 542. guide pin shaft hole; 543. front arm rotating sleeve.

DETAILED DESCRIPTION OF THE EMBODIMENTS

The structure, functionality, and processing of the current invention are further described below with reference to the accompanying drawings and the concrete implementation examples. However, the protective range of this present invention includes but not limited to that.

The high-speed transplanting mechanism having a laterally openable/closable duckbill according to the present invention includes the duckbill soil penetration angle adjusting arm 5. By adjusting the reverse-threaded adjusting screw rod, the duckbill transplanter can be tilted in a direction opposite to a driving direction of the transplanting machine. The backward tilting pot seedlings which are planted in a moment can be supported and pushed upright by the inertia thereof and the action of the rolling wheel turns the soil. That is, the backward tilting pot seedlings can be supported and pushed upright by the forward inertia thereof, overturning the conventional notion that seedling delivery and transplanting must be stationary; it can solve the problem of slow planting speed, low upright degree, and low planting quality, and increasing the quality and efficiency of transplanting. A transplanting mechanism having a laterally openable/closable duckbill suitable for a high-speed transplanter is provided in the present invention, its transplanting speed can be more than 60 pot seedlings per minute.

FIG. 1 is a schematic structural view of the high-speed transplanting mechanism having a laterally openable/closable duckbill in this present invention. This mechanism includes a power input portion, a driving shaft 2, a rocker 3, a connecting rod 4, a transplanting power arm 6, a duckbill soil penetration angle adjusting arm 5, a duckbill transplanting portion 9 and mounting base of the transplanting device 10. The mounting base of the transplanting device is provided with a power arm support shaft 101 and an adjustable arm support shaft 102. The end of the driving shaft 2 is connected to the power input portion 1, the other end of the driving shaft 2 is fixed on the end of the rocker 3, and the other end of the rocker 3 is hinged with the middle of the transplanting power arm 6. The end of the transplanting power arm 6 is hinged with the duckbill transplanting portion 9, and the other end of the transplanting power arm 6 is hinged with the power arm support shaft 101 of the mounting base of the transplanting device 10. The pot seedling upright keeping unit is installed on the transplanter.

Figure 2:
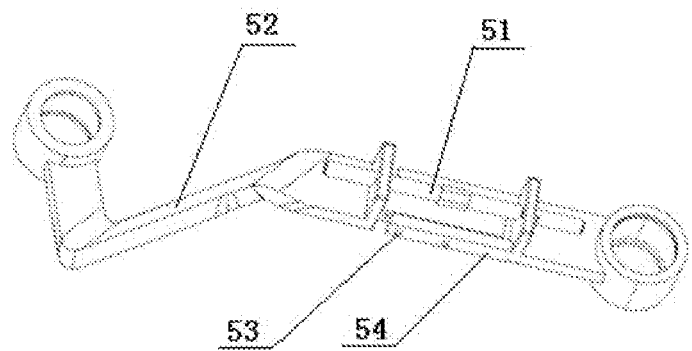
FIG. 2: Schematic structure view of the duckbill soil penetration angle adjusting arm.

FIG. 2 is a schematic structural view of the duckbill soil penetration angle adjusting arm 5. This duckbill soil penetration angle adjusting arm has a rear arm 52 and a front arm 54 with one end each thereof connected by means of a reverse-threaded adjusting screw rod 51, and other ends thereof hingedly connected to an adjusting arm support shaft (102) and the duckbill transplanting portion (9) respectively, the end of the rear arm 52 is provided with a left-handed threads hole 521, and the other end of the rear arm 52 is hinged with the adjustable arm support shaft 102; the end of the front arm 54 is provided with a right-handed threads hole 541, and the other end of the front arm 54 is hinged with the duckbill transplanting portion 9. The reverse-threaded adjusting screw rod 51 is connected by threaded holes in the rear arm 52 and in the front arm 54 respectively. The rear arm rotating sleeve 523 is on one end of the rear arm 52, and the rear arm rotating sleeve 523 hinged to the adjustable arm supports shaft 102. The front arm rotating sleeve 543 is on one end of the front arm 54, and the front arm rotating 543 hinged to the duckbill transplanting portion 9. A length of the reverse-threaded adjusting screw rod (51) enables the duckbill to tilt in a direction opposite to a driving direction of a transplanting machine, and a vertical central straight line of the duckbill makes an angle with the ground capable of being adjusted between 65°-85°. Adjust the reverse-threaded adjusting screw rod 51 allows the duckbill soil penetration angle adjusting arm 5 to extend or shorten. The duckbill soil penetration angle increases when the duckbill soil penetration angle adjusting arm 5 elongations is adjusted. Too large duckbill soil penetration angle is not conducive to high-speed transplanting and the pot seedlings upright. The effect is better when the duckbill soil penetration between 75°-85°. In addition, in order to make the duckbill soil penetration angle easier to be observed or adjusted, the angle scale plate is set on one side of the duckbill transplanting portion 9.

The power input portion 1 can be driven by an electric motor or a fuel engine. The prime power of the fuel engine or the electric motor is inputted by the power input portion 1, then the driving shaft 2 turns the rocker 3, and drives the transplanting power arm 6 through the connecting rod 4, in turn, drives the duckbill transplanting portion 9 moves up and down. According to the information obtained from the rotary speed of duckbill transplanting portion 9 matching with the land wheel speed of the transplanter, the duckbill opens and closes by the duckbill opening and closing control part 7 to complete the transplanting of the pot seedling, and the transplanting of the pot seedling is consistent with its agronomic requirements. The lateral adjusting rod 8 is used for the installation and adjustment of the duckbill transplanting portion 9.

In order to prevent the effect of vibration on the transplanting quality caused by the change of the length of the duckbill soil penetration angle adjusting arm 5 during the operation of the transplanting, the two ends of the reverse-threaded adjusting screw rod 51 are respectively equipped with fastening nuts to prevent the loosening of the reverse-threaded adjusting screw rod 51.

Figure 3:
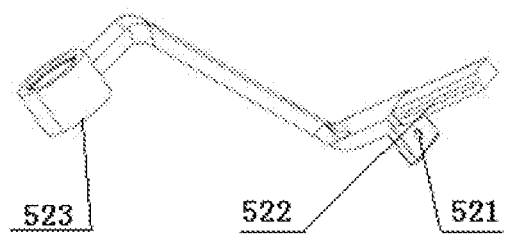
FIG. 3: Schematic structure view of the rear arm.
Figure 4:
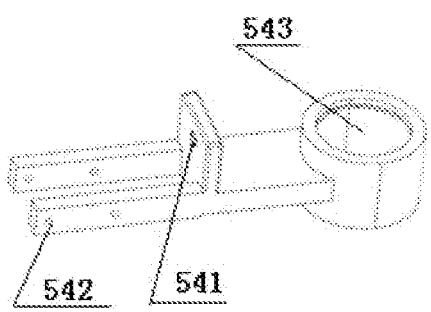
FIG. 4: Schematic structure view of the front arm.

In this embodiment, in order to improve the strength of the duckbill soil penetration angle adjusting arm 5 and to facilitate the adjustment of its length, an extension part is set at one end with screw holes in the rear arm 52 and the front arm 54 respectively, and two extension parts can be connected by sliding fit. Specifically, there are multiple ways to assemble two extension parts, as shown in FIG. 2, FIG. 3, FIG. 4, the sliding adjusting groove 522 is provided at one end of the rear arm 52 connected to the front arm 54, the guide pin shaft 53 is provided at one end of the front arm 54 connected to the rear arm 52, the guide pin shaft 53 is installed in the guide pin shaft hole 542, and the guide pin shaft 53 interference fits with the pin shaft hole 542. The guide pin shaft 53 is inserted into the slide adjustment groove 522, and the guide pin shaft 53 can slide in the slide adjustment groove 522 to play a guiding role.

In addition, where the extension part of the front arm 54 has a counterbore that corresponds to the sectional shape of the extension part of the rear arm 52, the extension part of the rear arm 52 is inserted into the counterbore, and the two sides of the counterbore are the sliding guide fit. There are some ball bearings between the extending part of the rear arm 52 and both sides of the counter bore, it can reduce the friction between the extension part of the rear arm 52 and the counterbore when adjusting the lateral adjusting rod 8, and it can easily adjust the length of the duckbill soil penetration angle adjusting arm 5.

The embodiments are preferred implementation manners of this present invention; however, this present invention includes but not limited to the foregoing implementation manners. Any obvious improvements, replacements or variations that can be made by a person skilled in the art without departing from the substantial content of the present invention fall within the protection scope of the present invention.

The invention claimed is:

1. A transplanting mechanism having a laterally openable/closable duckbill, the transplanting mechanism comprising: a power input portion (1), a driving shaft (2), a rocker (3), a connecting rod (4), a transplanting power arm (6), a duckbill soil penetration angle adjusting arm (5), a duckbill transplanting portion (9), a pot seedling upright device, a mounting base of the transplanting device (10); wherein the mounting base of the transplanting device (10) has a power arm support shaft (101) and an adjustable arm support shaft (102); a first end of the driving shaft (2) is connected to the power input portion (1), a second end of the driving shaft (2) is fixed at a first end of the rocker (3), and a second end of rocker (3) is hinged with a middle of the transplanting power arm (6), a first end of the transplanting power arm (6) is hinged with the duckbill transplanting portion (9), and a second end of the transplanting power arm (6) is hinged with the power arm supporting shaft (101); the pot seedling upright device is installed on the duckbill transplanting portion (9); the duckbill soil penetration angle adjusting arm (5) has a rear arm (52) and a front arm (54) with a first end of the rear arm (52) and a first end of the front arm (54) connected by means of a reverse-threaded adjusting screw rod (51), and a second end of the rear arm (52) and a second end of the front arm (54) hingedly connected to the adjustable arm support shaft (102) and the duckbill transplanting portion (9) respectively; wherein a length of the reverse-threaded adjusting screw rod (51) enables the duckbill to tilt in a direction opposite to a driving direction of a transplanting machine, and a vertical central straight line of the duckbill creates an angle with the ground capable of being adjusted between 65°-85°.

2. A transplanting mechanism having a laterally openable/closable duckbill according to claim 1, wherein the reverse-threaded adjusting screw rod (51) is adjustable such that a vertical central straight line of the duckbill makes creates an angle with the ground capable of being adjusted between 65°-85°.

3. A transplanting mechanism having a laterally openable/closable duckbill according to claim 1, wherein each end of the reverse-threaded adjusting screw rod (51) is equipped with fastening nuts.

4. A transplanting mechanism having a laterally openable/closable duckbill according to claim 1, wherein an extension part is set at an end of a screw hole of the rear arm (52) and an extension part is set at an end of a screw hole of the front arm (54), and wherein the extension parts of the rear arm and the front arm are connected by sliding fit.

5. A transplanting mechanism having a laterally openable/closable duckbill according to claim 4, wherein a sliding adjusting groove (522) is provided on the extension part of the rear arm (52) that is connected to the front arm (54), a guide pin shaft (53) is provided on the extension part of the front arm (54) that is connected to the rear arm (52), wherein the guide pin shaft (53) is inserted into the sliding adjusting groove (522).

6. A transplanting mechanism having a laterally openable/closable duckbill according to claim 4, wherein the extension part of the front arm (54) has a counterbore that corresponds to a sectional shape of the extension part of the rear arm (52), the extension part of the rear arm (52) is inserted into the counterbore, and wherein two sides of the counterbore guide the sliding fit.

7. A transplanting mechanism having a laterally openable/closable duckbill according to claim 6, wherein ball bearings are located between the extension part of the rear arm (52) and the counterbore.

8. A transplanting mechanism having a laterally openable/closable duckbill according to claim 1, wherein an angle scale plate is set on one side of the duckbill transplanting portion (9).

\* \* \* \* \*